(12) United States Patent
Chen et al.

(10) Patent No.: US 8,315,842 B2
(45) Date of Patent: Nov. 20, 2012

(54) SYSTEMS AND METHODS FOR MODELING OF CRYSTALLIZATION PROCESSES

(75) Inventors: Chau-Chyun Chen, Lexington, MA (US); Xiang He, Revere, MA (US); Selim Anavi, Waltham, MA (US)

(73) Assignee: Aspen Technology, Inc., Burlington, MA (US)

( * ) Notice: Subject to any disclaimer, the term of this patent is extended or adjusted under 35 U.S.C. 154(b) by 619 days.

(21) Appl. No.: 12/207,991

(22) Filed: Sep. 10, 2008

(65) Prior Publication Data

US 2010/0063783 A1    Mar. 11, 2010

(51) Int. Cl.
  *G06G 7/50* (2006.01)
  *G06F 7/60* (2006.01)
(52) U.S. Cl. ............ 703/2; 703/1; 703/6; 703/9; 703/12
(58) Field of Classification Search ............... 703/5, 6, 703/1, 2, 9, 12
  See application file for complete search history.

(56) References Cited

U.S. PATENT DOCUMENTS

| | | | |
|---|---|---|---|
| 5,687,090 A * | 11/1997 | Chen et al. ............... | 703/6 |
| 6,093,211 A * | 7/2000 | Hamielec et al. ........... | 703/12 |
| 2004/0230411 A1* | 11/2004 | Zheng et al. .............. | 703/6 |
| 2004/0258589 A1* | 12/2004 | Golovanoff ............... | 422/245.1 |
| 2006/0262235 A1* | 11/2006 | Vogels et al. ............. | 349/10 |
| 2007/0289105 A1* | 12/2007 | Sirkar et al. ............. | 23/295 R |
| 2008/0134961 A1* | 6/2008 | Bao et al. ................ | 117/86 |
| 2010/0106467 A1* | 4/2010 | Attarakih ................ | 703/2 |

OTHER PUBLICATIONS

R. J. Farrell and Y. C. Tsai, "Modeling, Simulation and Kinetic Parameter Estimation in Batch Crystallization Processes", pp. 586-593. vol. 40, No. 4, AICHE Journal, Apr. 1994.*
G. Lee, E. S. Yoon, Y. Lim, J. M. L. Lann, X. Meyer, and X. Joulia, "Adaptive Mesh Method for the Simulation of Crystallization Processes Including Agglomeration and Breakage: the Potassium Sulfate System", pp. 6228-6235, 2001 American Chemical Society.*
G. Lee E. S. Yoon, Y. Lim, J. M. L. Lann, X. Meyer, and X. Joulia, "Adaptive Mesh Method for the Simulation of Crystallization Processes Including Agglomeration and Breakage: the Potassium Sulfate System", pp. 6228-6235, 2001 American Chemical Society.*
R. J. Farrell and Y. C. Tsai, "Modeling, Simulation and Kinetic Parameter Estimation in Batch Crystallization Processes",pp. 586-593, vol. 40, No. 4, AICHE Journal, Apr. 1994.*
P. J. Hill "Batch Crystallization", pp. 151-203, 2006 by Taylor & Francis Group, LLC.*
Notification of Transmittal of International Search Report and the Written Opinion, with the International Search Report and Written Opinion, 11 pp., mailed Feb. 22, 2010, issued in International Application No. PCT/US2009/055053.

(Continued)

*Primary Examiner* — David Silver
*Assistant Examiner* — Kibrom Gebresilassie
(74) *Attorney, Agent, or Firm* — Hamilton, Brook, Smith & Reynolds, P.C.

(57) ABSTRACT

A computer system and method of modeling a crystallization process includes representing a plurality of crystals in a solution by different subsets of the plurality, tracking increase of the respective characteristic length of each crystal group, and determining a crystal size distribution to output a model to a user. Each subset forms a respective crystal group characterized by group attributes of (i) a number of crystals and (ii) a characteristic length. Additionally, the system and method track generation of new crystal groups generated by seeding, nucleation and/or breakage.

20 Claims, 11 Drawing Sheets

OTHER PUBLICATIONS

Braatz, Richard D., "Advanced Control of Crystallization Processes," *Annual Reviews in Control*, 26:87-99 (2002).

Laloue, N., et al., "Dynamic Modeling of a Batch Crystallization Process: A stochastic Approach for Agglomeration and Attrition Process," *Chemical Engineering Science*, 62:6604-6614 (2007).

Fitzgerald, T.J, and Yang, T., "Size Distribution for Crystallization with Continuous Growth and Breakage," *Ind. Eng. Chem. Fundam.*, 11(4):588-590 (1972).

Bermingham, S.K., et al., "Optimal Design of Solution Crystallization Processes with Rigorous Models," *Trans IChemE* 81(a): 893-903 (Sep. 2003).

Bove, S., et al., "A novel algorithm for solving population balance equations: the parallel parent and daughter classes. Derivation, analysis and testing," *Chemical Engineering Science* 60: 1449-1464 (Mar. 2005).

Bustamante, P., et al., "Thermodynamic Origin of the Solubility Profile of Drugs Showing One or Two Maxima against the Polarity of Aqueous and Nonaqueous Mixtures: Niflumic Acid and Caffeine," *J. Pharmaceutical Sciences* 91(3): 874-883 (Mar. 2002).

Ma, D.L. et al., "Optimal control and simulation of multidimensional crystallization processes," *Computers and Chemical Engineering* 26: 1103-1116 (Aug. 2002).

Ramkrishna, D., and Mahoney, A.W., "Population balance modeling. Promise for the future," *Chemical Engineering Science* 57: 595-606 (Feb. 2002).

Wulkow, M., et al., "Modeling and simulation of crystallization processes using parsival," *Chemical Engineering Science* 56: 2575-2588 (Apr. 2001).

Wynn, E.J.W., and Hounslow, M.J., "Integral population balance equations for growth," *Chemical Engineering Science* 52(5): 733-746 (Mar. 1997).

Costa, C.B.B., et al., "Considerations on the crystallization modeling: Population balance solution," *Computers & Chemical Engineering* 31: 206-218 (Jan. 2007).

Hounslow, M.J., et al., "A Discretized Population Balance for Nucleation, Growth, and Aggregation," *AIChE Journal* 34(11): 1821-1832 (Nov. 1988).

Hu, Q., et al., "Modelling and optimization of seeded batch crystallizers," *Computers & Chemical Engineering* 29: 911-918 (Mar. 2005).

Kumar, S. and Ramkrisha, D., "On the solution of population balance equations by discretization—III. Nucleation, growth and aggregation of particles," *Chemical Engineering Science* 52(24): 4659-4679 (Dec. 1997).

Lee, G., et al., "Adaptive Mesh Method for the Simulation of Crystallization Processes Including Agglomeration and Breakage: the Potassium Sulfate System," *Ind. Eng. Chem. Res.* 40: 6228-6235 (Nov. 2001).

Myerson, A.S., ed., *Handbook of Industrial Crystallization, Second Edition* (Boston: Butterworth-Heinemann), pp. 43-58, 101-102, 234-237 (2002).

Mullin, J.W., *Crystallization, Fourth Edition* (Oxford: Elsevier Butterworth-Heinemann) pp. 423-426 (2001).

Randolph, A.D. and Larson, M.A., *Theory of Particulate Processes: Analysis and Techniques of Continuous Crystallization, Second Edition* (San Diego: Academic Press), pp. vii-x, 50-79 (1988).

* cited by examiner

SYSTEMS AND METHODS FOR MODELING OF CRYSTALLIZATION PROCESSES

BACKGROUND OF THE INVENTION

Crystallization is one of the most important separation and purification techniques employed industrially to produce a wide variety of materials. Crystallization is a common unit operation, used for producing a high purity solid phase from a fluid phase with a different composition. A key index of product quality is the product crystal size distribution (CSD). Specifically, for efficient downstream operations and product effectiveness, controlling the crystal size distribution can be critically important. Although there is wide awareness of the importance of crystallization, the optimal design and operation of crystallization processes still pose many problems such as the difficulty of developing a controlled cooling scheme or a strategy for antisolvent addition, which might lead to an undesired supersaturation. In short, there is a relative lack of systematic design procedures and predictive models to help overcome or avoid these problems.

The most well established approach to modeling of crystallizers is the population balance approach. See A. D. Randolph, and M. A. Larson, *Theory of Particulate Processes* (1988). Population balance equations (PBEs) provide a mathematical framework for dealing with processes involving formation of entities, growth, breakage or aggregation of particles, as well as dispersion of one phase into another phase. See E. J. Wynn and M. J. Hounslow, *Integral Population Balance Equations for Growth*, Chem. Eng. Sci. 52, 733 (1997); D. Ramkrishna and A. W. Mahoney, *Population Balance Modeling. Promise for the Future*, Chem. Eng. Sci. 57, 595 (2002). This mathematical approach follows the number of entities, such as solid particles, in such a way that their presence or occurrence predicts the behavior of the system under consideration. Population balance equations, however, are hyperbolic partial differential equations coupled with other ordinary differential and algebraic equations, and therefore they become large integro-partial differential algebraic equation (IPDAE) systems. These IPDAE systems usually cannot be solved analytically and therefore must be solved numerically. Various numerical techniques have been developed for solving IPDAE systems. See M. Wulkow, A. Gerstlauer, and U. Nieken, *Modeling and Simulation of Crystallization Processes Using Parsival*, Chem. Eng. Sci. 56, 2575 (2001). Each of these techniques has its own advantages and disadvantages usually requiring trade-offs between computational effort and accuracy of the model predictions, and requiring substantial implementation effort, specialized user training, and extensive user input.

Therefore, there is a need for a simpler modeling approach that addresses the disadvantages of prior models of crystallization processes.

SUMMARY OF THE INVENTION

The present invention relates to a crystallization modeling method and system that simulate and track the crystal growth phenomenon. The method and system focus on crystal sizes and follow the progress of particles beginning with their insertion, either through seeding or generation as nuclei, and compute their contribution to the final crystal size distribution. This modeling method and system can be useful for the conceptual design or parameter estimation of crystallization processes, providing quick and qualitative trend predictions.

In one embodiment, the inventive method of modeling a crystallization process comprises: (a) representing a plurality of crystals in a solution by different subsets of the plurality, wherein each subset forms a respective crystal group characterized by group attributes including a number of crystals and a characteristic length, (b) tracking increase of the respective characteristic length of each crystal group, and (c) determining a crystal size distribution to output a model to a user. In some embodiments, the crystallization process is a batch process. In other embodiments, the crystallization process is a continuous process.

In another embodiment, the method further includes tracking generation of new crystal groups generated by seeding, nucleation, or breakage. In yet another embodiment, the method further includes tracking change in number of crystals in each crystal group. In one embodiment, the change in the number of crystals in a respective crystal group is a result of crystal breakage.

In another embodiment, the step of tracking generation of new crystal groups generated by nucleation includes computing the number of nuclei generated during a discrete time interval by calculating a nucleation rate. In yet another embodiment, the step of tracking generation of new crystal groups generated by breakage includes computing the number of crystals in each child crystal group as the number of crystals in the parent crystal group whose respective characteristic length exceeds a breakage length threshold multiplied by a breakage ratio and multiplied by number of crystal fragments, and computing the characteristic length of the respective child crystal group by dividing the characteristic length of the respective parent crystal group by the number of crystal fragments.

In one embodiment, the increase of the respective characteristic length of each crystal group is the result of crystal growth. In another embodiment, the number of crystals in the crystal group is calculated by dividing a mass of the crystal group by a density of crystals.

In yet another embodiment, the tracking step is performed over discrete time intervals. In one embodiment, the step of tracking the increase of the respective characteristic length of each crystal group includes calculating a growth rate in length of a single crystal. In another embodiment, the method further includes computing the supersaturation of the solution.

In one embodiment, a computer program product includes a computer readable storage medium having stored thereon a set of computer program instructions for modeling a crystallization process, including the instructions to (a) represent a plurality of crystals in a solution by different subsets of the plurality, wherein each subset forms a respective crystal group characterized by group attributes including a number of crystals and a characteristic length, (b) track increase of the respective characteristic length of each crystal group, and (c) determine a crystal size distribution to output a model to a user. In another embodiment, at least some portion of the set of computer program instructions include instructions to request data or request instructions over a computer network. In yet another embodiment, at least some portion of the set of computer program instructions is transmitted over a global computer network. In one embodiment, the computer readable storage medium includes a removable storage medium. In another embodiment, the removable storage medium includes any of a CD-ROM, a DVD-ROM, a diskette, and a tape.

In another embodiment, a computer system for modeling a crystallization process includes input means for obtaining user-provided chemical data, and a digital processor coupled to receive the obtained chemical data from the input means. The digital processor executes a modeling system in working memory, wherein the modeling system represents a plurality of crystals in a solution by different subsets of the plurality. Each subset forms a respective crystal group characterized by group attributes including a number of crystals and a characteristic length. Next, the modeling system tracks increase of the respective characteristic length of each crystal group, and determines a crystal size distribution. From the crystal size distribution, the modeling system forms a model of the crystallization process. Output means coupled to the digital processor provide to a user the formed model of the crystallization process.

Yet another embodiment includes a pharmaceutical compound manufactured by a process that includes the inventive modeling method. The modeling method models a crystallization process and comprises the computer implemented steps of (a) representing a plurality of crystals in a solution by different subsets of the plurality, wherein each subset forms a respective crystal group characterized by group attributes including a number of crystals and a characteristic length, (b) tracking increase of the respective characteristic length of each crystal group, and (c) determining a crystal size distribution to output a model to a user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
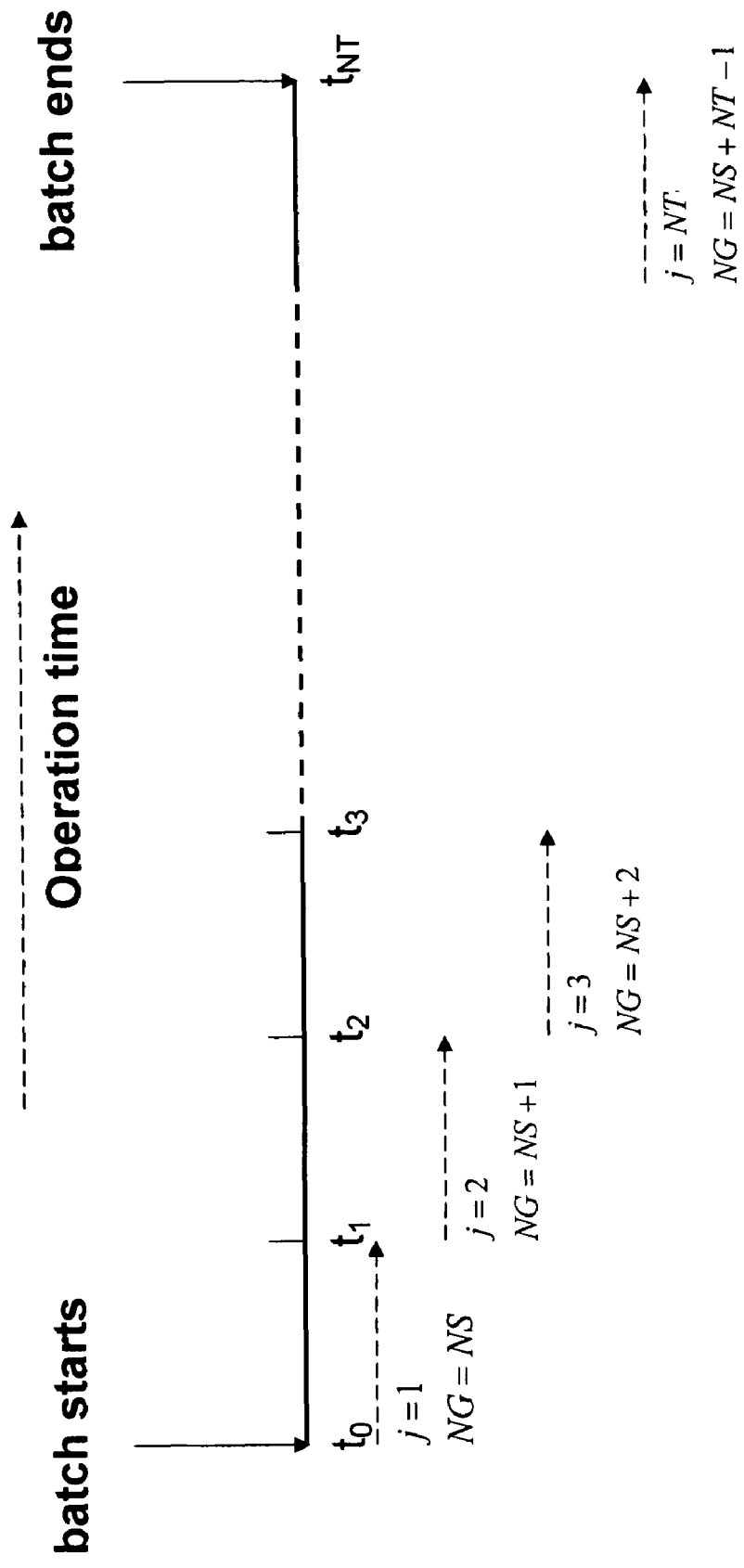
FIG. 1 is a diagram of a discretized time grid for integration in the present invention.

A description of example embodiments of the invention follows.

The invention is directed to a method and system of modeling a crystallization process that focus on following the progress of particle sizes, which leads to integrals from earlier times and earlier sizes until the present time and present size. In one embodiment, the method of modeling a crystallization process comprises (a) representing a plurality of crystals in a solution by different subsets of the plurality, wherein each subset forms a respective crystal group characterized by group attributes including a number of crystals and a characteristic length, (b) tracking increase of the respective characteristic length of each crystal group, and (c) determining a crystal size distribution to output a model to a user. A dynamic crystal group adding procedure may be included, wherein new crystal groups are dynamically added into the calculation procedure (described below). In some embodiments, the crystallization process is a batch process. In other embodiments, the crystallization process is a continuous process, wherein the residence time of the solution in the crystallizer is the crystal growth time.

A crystal group (GP) is used to represent a group (collection or subset) of crystals with the same size. The crystal group has at least two attributes, namely the total number (n) of crystals in the group and the length (L) of the crystal. A given number of crystal groups are present at the beginning of the crystallization process, which account for the crystal size distribution (CSD) that results from the initial seed crystals added into the solution. Then, new crystal groups are added into the calculation procedure during the crystallization process, as needed to account for the influence on the CSD of nucleation, subsequent seeding, and/or crystal breakage.

In one embodiment, the method of modeling a crystallization process further includes the step of tracking of new crystal groups generated by seeding, nucleation, and/or breakage. In another embodiment, the method includes the step of tracking change in number of crystals in each crystal group. In a batch crystallization process, new crystals can be formed by addition of seed crystals or by nucleation. Seeding is a common practice in many batch crystallizations in an attempt to control the product CSD. If seed crystals with a particular size distribution are introduced into a batch crystallizer at time zero, the initial distribution is simply the CSD of the seed crystals. This information can be used as the initial conditions in the inventive model. Nucleation generates nuclei during the batch process. After being generated, nuclei grow along with other crystals. This consequently affects the product CSD. In the model development that follows, applicants first consider crystal growth in a seeded batch crystallization process.

When seed crystals are introduced into a crystallization process to control the product CSD, the user provides the seed sizes and the corresponding number of seed crystals. Alternately, the number of crystals in the crystal group can be calculated by dividing a mass of the crystal group by a density of crystals. Suppose the seed crystals have NS different sizes or lengths: $LS_i$ ($i=1 \sim NS$); the number of seed crystals with size $LS_i$ is $n_i$. Such information can be represented by $GP_i(n_i, LS_i)$. As the crystals grow during the batch process based on the growth kinetics, the size attribute (i.e., crystal length L) of each group increases, while the number attribute remains unchanged.

In this model development, the crystal growth kinetics are based on diffusion layer theory. Thus, the growth rate or increase of the respective characteristic length of a single crystal, $G(L)$, can be calculated from:

$$G(L) = \frac{dL}{dt} = k_G(\Delta C)^g(1+\gamma L)^\alpha \quad (1)$$

where L is the crystal characteristic length, and $k_G$ is the overall crystal growth coefficient, which may be temperature-dependent and fit to the Arrhenius equation to obtain a general expression:

$$k_G = A\exp(-E_G/RT) \quad (2)$$

where R is the gas constant and T (Kelvin) is the temperature of the solution.

A constant value can also be used for $k_G$ if the functional form of the activation energy $E_G$ is not available. The exponent g is referred to as the order of the overall crystal growth process, which is usually between 1 and 2. $\gamma$ and $\alpha$ are experimentally determined constants, with the value of $\alpha$ normally less than 1. Applying the growth rate to each crystal group, one gets an ordinary differential equation (ODE) system with NS equations:

$$\frac{dL_i}{dt} = k_G(\Delta C)^g(1+\gamma L_i)^\alpha \quad (i = 1 \sim NS) \quad (3)$$

initial condition:

when $t = t_0$, $L_i(t_0) = LS_i$ where $\Delta C$ is the supersaturation, which is the driving force for crystal growth and has a strong influence on the CSD:

$$\Delta C = C - C^* \quad (4)$$

where C is the bulk concentration and $C^*$ is the saturated concentration. The units of concentration C are kg(solute)/kg (solvent). During the batch process, solute precipitates to form crystals, which results in the changes of $L_1 \sim L_{NS}$, that is, the increase of the respective characteristic length of each crystal group is the result of crystal growth. Thus, the bulk concentration at any given time is indirectly a function of all the crystal sizes. The saturated concentration is determined by the solubility profile, which is affected by the temperature profile of the batch process and the solvent composition. Integrating the coupled ODE system (Eq. 3) from time zero to any given time $t_{out}$ generates the CSD contributed by the seeds: $(n_i, L_i(t_{out}))$, i=1~NS.

Figure 3:
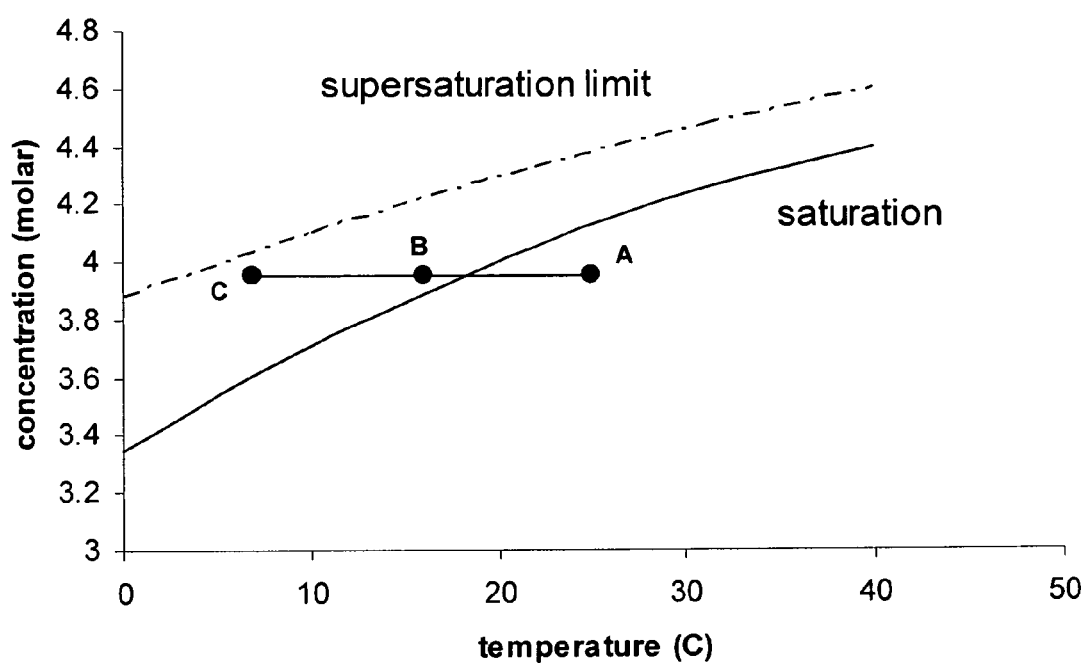
FIG. 3 is a graph of a metastable zone of supersaturation. The solid curve is the saturation curve and the dashed curve is the supersaturation limit curve. A metastable zone is the area between the two curves.

Crystal growth resulting from nucleation is considered next. During a crystallization process, supersaturated solution may exhibit a metastable zone, in which nucleation occurs. FIG. 3 shows an example of a metastable zone. In this example system, if one starts from point A, which is undersaturation, and cools to point B just above saturation, the solution would be supersaturated. If one allows the system to sit, it might take several days before nuclei form. If one cools the system down to point C and lets it sit, then nuclei are likely to form in a matter of hours. Nucleation is related to degree of supersaturation. The overall nucleation rate can be expressed as the sum of specific contributing factors:

$$B^\circ = B_p + B_s \quad (5)$$

where $B^\circ$ is the overall nucleation rate, $B_p$ is the primary nucleation rate, and $B_s$ is the secondary nucleation rate. Homogeneous nucleation, which belongs to primary nucleation, occurs in the absence of crystalline surfaces. It is usually induced by the presence of dissolved impurities. Secondary nucleation involves the presence of crystals and its interaction with the environment (crystallizer walls, impeller, etc.). In a seeded batch crystallizer, nuclei are mostly generated through secondary nucleation. The nucleation rate in this case is a function of the degree of agitation, the suspension density, and the supersaturation:

$$B = k_N I^h M_T^\beta (\Delta C)^b \quad (6)$$

where B is the nucleation rate, $k_N$ is the nucleation rate constant, and I is the agitation rate (usually in units of rotations per minute (rpm) or impeller tip speed). When a system has a constant agitation rate, I can be combined into $k_N$. Thus Eq. 6 can be rewritten as:

$$B = k_N' M_T^\beta (\Delta C)^b \quad (7)$$

where $k_N'$ is interchangeable with $k_N$, and $M_T$ is the suspension density (mass of crystals per volume of solution), which is indirectly a function of all the crystal sizes. The units of the nucleation rate B are number/(m³s). The nucleation kinetic order, b, is usually 0.5-2.5 for secondary nucleation and higher for primary nucleation. The exponent for $M_T$, $\beta$, may be taken as unity if secondary nucleation is the predominant nucleation mechanism. Applicants use Nu to represent the number of nuclei generated in a discrete time interval. Thus, Eq. 7 can be rewritten as:

$$B = \frac{dNu}{dt} = k_N' M_T^\beta (\Delta C)^b \quad (8)$$

To account for the influence nuclei have on the product CSD, Eq. 8 is solved in parallel with Eq. 3, which results in NS+1 ODEs.

The number of equations (NS) in Eq. 3 is the number of crystal groups sorted by the seed sizes, and the number attribute of each crystal group remains unchanged during the batch. To deal with the number of newly generated nuclei and the growth from nuclei, new crystal groups are introduced into the system. This procedure includes two steps:

(1) Integrate Eq. 8 from $t=t_0$ to $t=t_1$ to calculate the number of nuclei:

$$Nu(t_1) = \int_{t_0}^{t_1} \frac{dNu}{dt} dt \quad (9)$$

(2) Introduce a new crystal group: $GP_{NS+1}(Nu(t_1), L_n)$ where $L_n$ is the characteristic length of nuclei. The crystal growth rate obtained from Eq. 1 will be applied to $L_n$ after $GP_{NS+1}$ exists.

The two-step procedure shows that in time period $t=t_0 \sim t_1$, the system has NS+1 ODEs and the CSD is contributed by NS crystal groups, while from $t=t_1$ on, the system has NS+2 ODEs and the CSD is contributed by NS+1 crystal groups. This calculation procedure can be applied to time periods: $t_2 \sim t_3$, $t_3 \sim t_4$, ..., until the end of the batch process. Consequently, the product CSD is contributed by NS+NT−1 crystal groups, where NT is the number of time periods.

Figure 2:
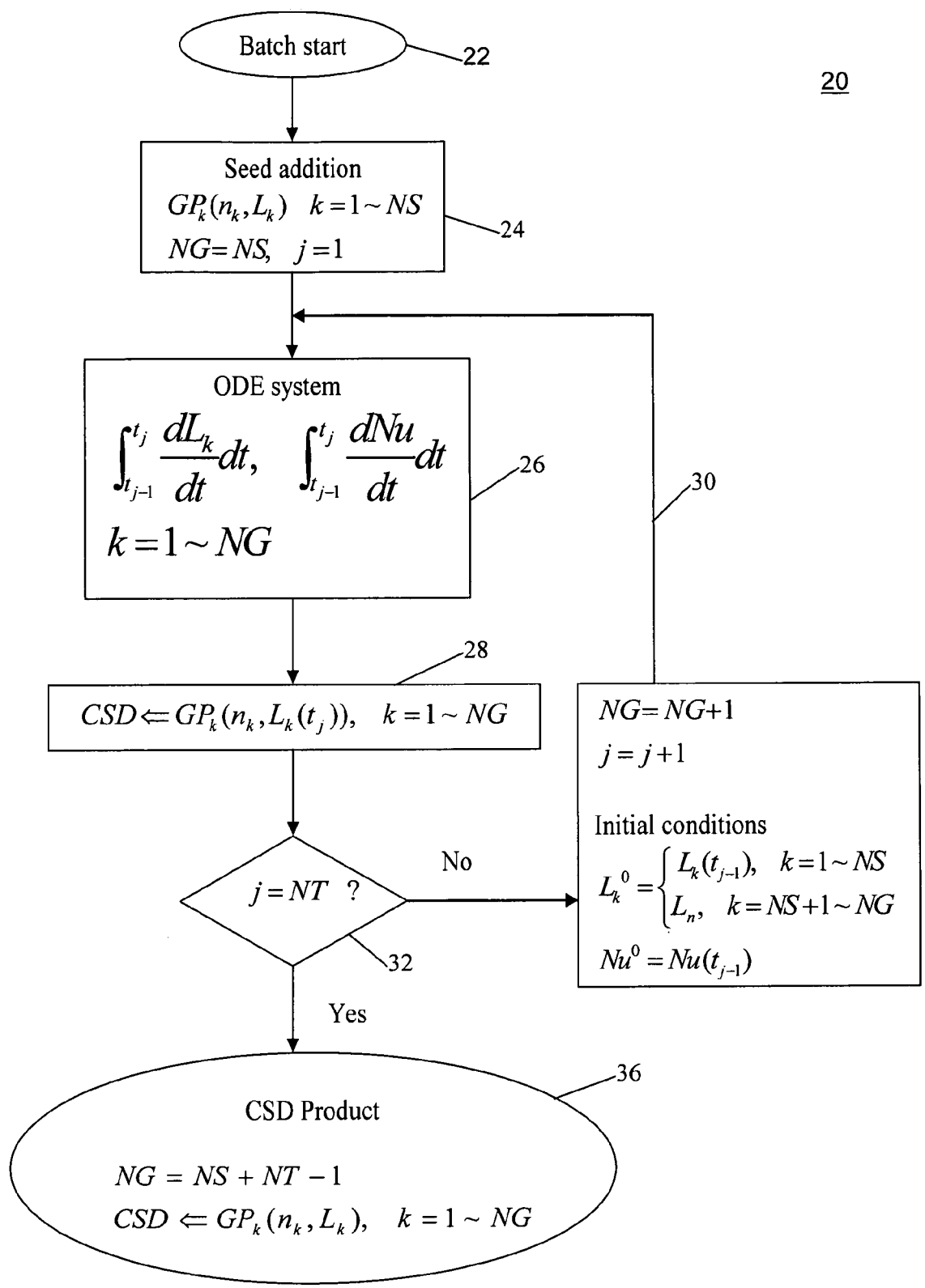
FIG. 2 is a flow chart of a model calculation (model process) employed by embodiments of the present invention.

Given the above, in one embodiment, the tracking steps (i.e., steps of tracking increase in characteristic length and new crystal groups) are performed over discrete time intervals. FIG. 1 shows the discretized time grid for integration. Here, there are NT time periods for the whole batch, and j denotes the jth grid. NG is the number of crystal groups. Integration is performed within each grid. The number of ODEs and crystal groups is updated at the beginning of each grid. The integration results are taken as the initial conditions for the ODEs in the next grid. After the integration is done for the last time period, the product CSD is generated and represented by all the crystal groups. FIG. 2 shows a flowchart of the inventive model process 20. Turning to FIG. 2, one embodiment provides and processes the inventive model as follows. At the start 22 of the batch crystallization process being modeled, seed crystals are introduced at time zero and the particular size distribution of the seed crystals is used as the initial model conditions at 24. That is, there is a number (NG) of crystal groups (GP) equal to the number (NS) of different sizes of seed crystals. For each crystal group ($GP_k$) there is crystal size or length $L_k$ and total number $n_k$ of crystals in the group.

For the first integration grid (j=1), batch operation progresses from time $t_0$ to $t_1$. At step 26, the modeling process system 20 integrates Eq. 3 and Eq. 8 as described above to account for crystal growth and new crystal groups, respectively.

At step 28, the (intermediate) resulting CSD is represented by all crystal groups $GP_k$ at $t_1$. NS crystal groups contribute to this intermediate CSD and the system 20 (step 26) has NS+1 ODEs.

Steps 26 and 28 are repeated for each succeeding integration grid (j=j+1), modeling the batch operation progressing from time $t_1$ to $t_2$ to . . . $t_{NT}$. The integration results of step 26 are taken as the initial conditions of the ODEs in the next (succeeding) grid. This is illustrated by loop 30. From time $t_1$ on the inventive modeling system 20 has NS+2 ODEs and the CSD is contributed by NS+1 crystal groups. In the last time period NT, integration grid j=NT and the end of the batch process is modeled (step 32). The resulting product CSD is contributed by NS+NT−1 crystal groups and is represented by all the crystal groups $GP_k$ (k=1 through NG) at 36. This serves as the model output of inventive system 20.

Crystal breakage is considered next. In a batch crystallizer, an impeller is often used to achieve uniform concentration, which helps to control supersaturation. However, the impeller can also cause crystal breakage because of the increased contact and abrasion between crystals and between crystal and impeller. As crystals grow bigger, the increased suspension density will also increase the possibility of crystal breakage.

In one embodiment, the change in the number of crystals in a respective crystal group is a result of crystal breakage. The actual causes and results of breakage can be complicated and hard to model. Where a goal of the present invention is to provide a simple and straight forward, and yet accurate enough modeling procedure that generates simulation results for prediction and design of batch crystallization process, a simple strategy is used to deal with crystal breakage. In this strategy, three parameters are needed for the calculation:

Breakage length threshold ($L_{bkg}$): The chance for small crystals to break is much smaller than that for bigger crystals. To simplify the calculation, applicants make a clear distinction between breakage and no breakage: crystals with their characteristic lengths shorter than $L_{bkg}$ do not break, while a fraction (percentage) of crystals bigger than $L_{bkg}$ break.

Breakage ratio ($R_{bkg}$): Even with a fast impeller and a dense crystal suspension, not all the big crystals break. $R_{bkg}$ is used to describe the breakage percentage of the crystals which exceed the length threshold.

Number of child crystals ($N_{bkg}$): After a crystal breaks, it produces several child crystals (fragments) with certain length. $N_{bkg}$ specifies the number of child crystals (also referred to as crystal fragments). Here, one embodiment of the invention assumes that all the child crystals have identical characteristic length. Thus the child crystals generated from one parent crystal group can all be incorporated into one child crystal group.

The number attribute of a child crystal group is the number attribute of the parent crystal group multiplied by the breakage ratio, then multiplied again by a number of crystal fragments. The length attribute equals the characteristic length of the parent crystal group divided by the number of crystal fragments.

During the simulation procedure 20 of a crystallization batch, the length attribute of each crystal group is checked at the end of a discretized time grid, as indicated by the diagram shown in FIG. 1. For example, embodiments assume in a simulation at the end of time grid j, there are totally NG crystal groups. Comparing the length attribute of each group with $L_{bkg}$, the inventive system 20 identifies that the crystals in two groups $GP_3$ and $GP_4$ are bigger than $L_{bkg}$:

$$L_3(t_j) \geq L_{bkg}$$

$$L_4(t_j) \geq L_{bkg} \tag{10}$$

Thus, two crystal groups are introduced to account for the crystal breakage: $GP_{NG+1}(n_{NG+1}, L_{NG+1})$ and $GP_{NG+2}(n_{NG+2}, L_{NG+2})$. The group attributes can be expressed as the following:

$$GP_{NG+1}: n_{NG+1} = n_3 \times R_{bkg} \times N_{bkg}, L_{NG+1} = L_3/N_{bkg}$$

$$GP_{NG+2}: n_{NG+2} = n_4 \times R_{bkg} \times N_{bkg}, L_{NG+2} = L_4/N_{bkg} \tag{11}$$

At the beginning of the time grid j+1, $GP_{NG+1}$ and $GP_{NG+2}$ are part of the new ODE system (step 26 in FIG. 2). The newly generated child crystals grow from that time on and contribute to the final product CSD.

The distinguishing feature between crystal groups is the length (crystal size) attribute. After embodiments introduce the crystal groups for the child crystals generated from breakage, it is not guaranteed that the length attributes of these newly generated groups are unique. They might be very close to, or even identical to some existing groups. When this is the case, the child crystals can be incorporated into the existing groups. The redundant new groups will not affect the calculation results. However, they will make the visualization of results not clear. To address this, applicants pack crystal groups at the end of a batch before finishing the simulation. The length attributes of all the groups are compared, and if the length difference of crystals in two groups is smaller than the specified tolerance, embodiments combine the two groups. For the resulting group, the number attribute is the summation of crystal numbers of the two groups and the length attribute remains unchanged. This way, the crystal groups used for the final CSD are all unique.

Figure 14:
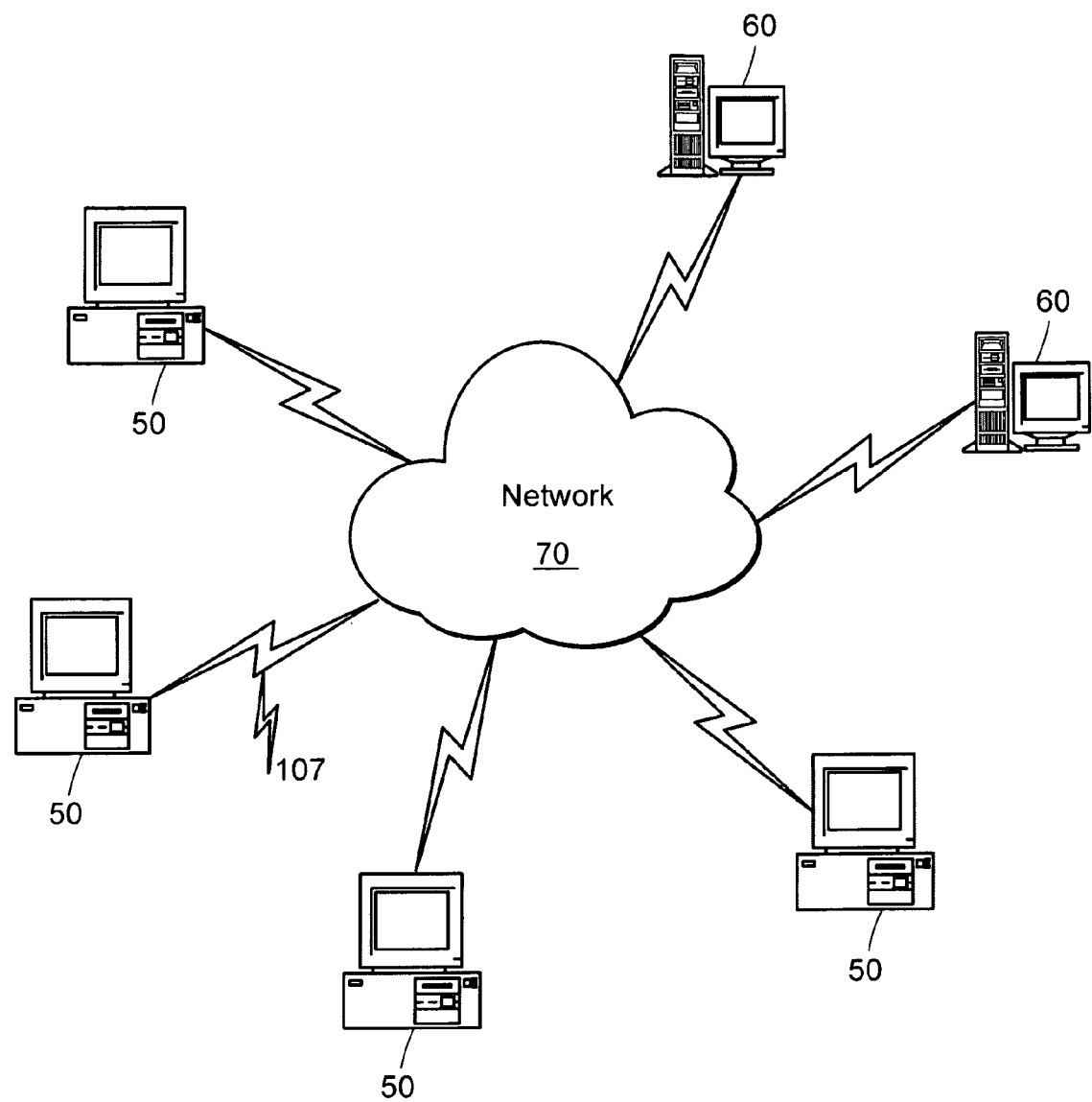
FIG. 14 is a schematic view of a computer network in which embodiments of the present invention are implemented.

FIG. 14 illustrates a computer network or similar digital processing environment in which the present invention can be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 15:
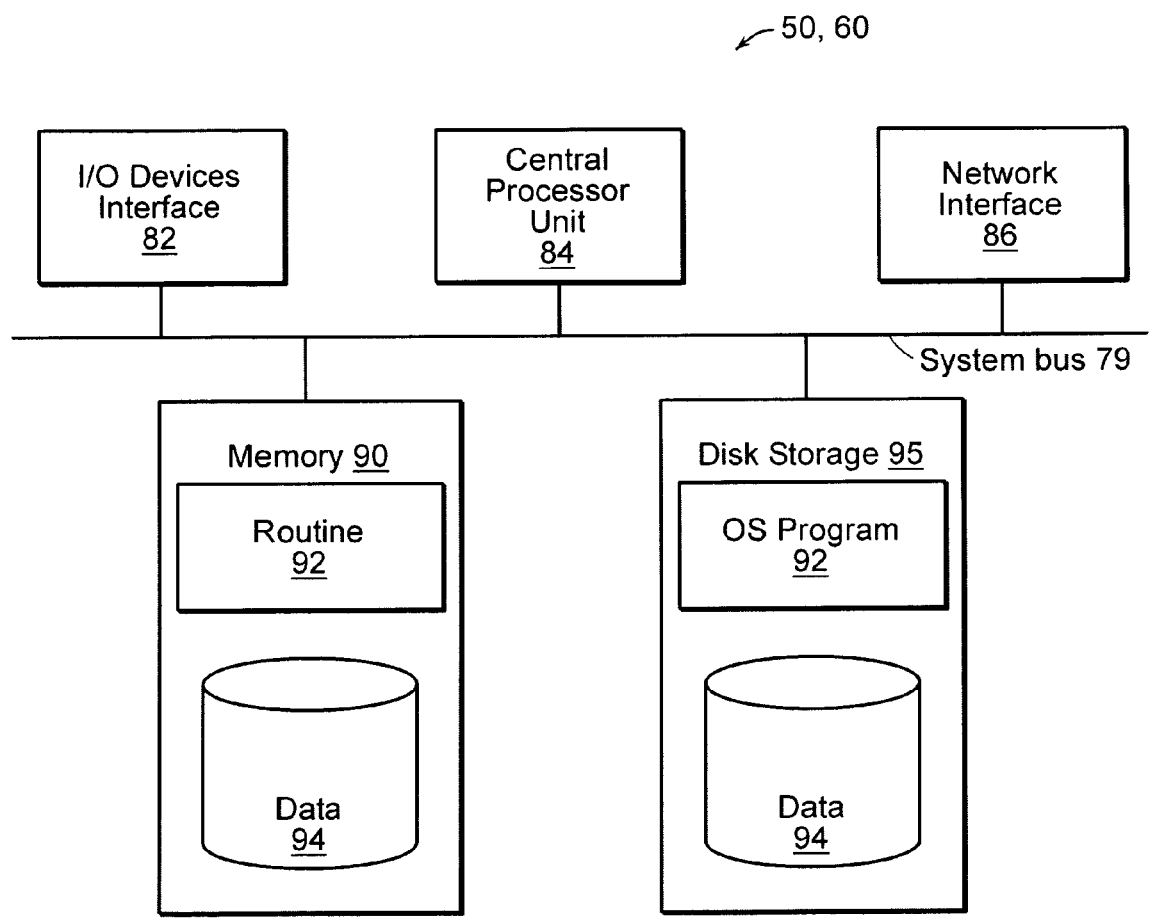
FIG. 15 is a block diagram of a computer node in the network of FIG. 14.

FIG. 15 is a diagram of the internal structure of a computer (e.g., client processor/device 50 or server computers 60) in the computer system of FIG. 14. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 14). Memory 90 provides volatile storage for computer software instructions 92 and data 94 used to implement an embodiment of the present invention (e.g., modeling process system 20 and subsystems/modules or process code detailed above in FIG. 2). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

EXEMPLIFICATION

Case Studies (Without Breakage)—Crystallizing from Caffeine-Water-Ethanol System Applicants use case studies here to better demonstrate the usage of the modeling framework and to show what results can be expected from the calculation. Applicants take an example system from literature, which contains three components: caffeine, water, and ethanol. Caffeine-Water-Ethanol system is a one solute/two solvents system. See P. Bustamante et al., *Thermodynamic Origin of the Solubility Profile of Drugs Showing One or Two Maxima Against the Polarity of Aqueous and Nonaqueous Mixtures: Niflumic Acid and Caffeine*, J. Pharm. Sci. 91, 874 (2002). Caffeine is the solute; Water and Ethanol are the solvents. Polymorphism exists in this system. There are two solid forms: the anhydrous form and the hydrate. The formations of the two solids can be represented by the two salt chemistries:

Salt chemistry 1 (in water poor solution):

(12)

Salt chemistry 2 (in water rich solution):

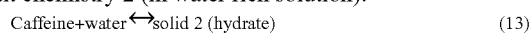
(13)

Figure 4:
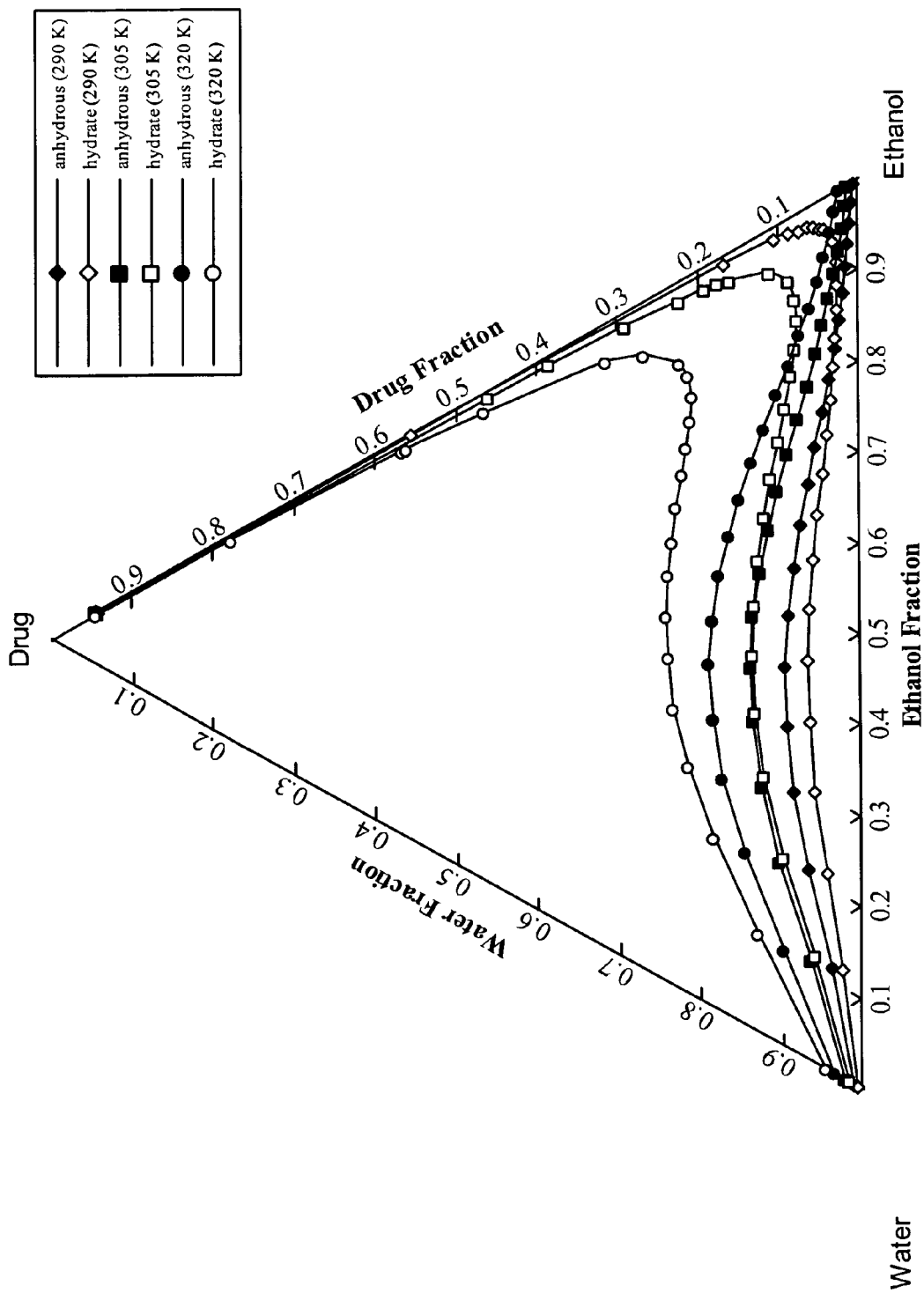
FIG. 4 is a graph of temperature and solvent ratio dependency of the solid solubility of caffeine.

The form of the crystallized solid depends on temperature and the solvent composition, which is the water/ethanol ratio. The solid phase transition may appear at certain ratios depending on the temperature of the saturated solutions. FIG. 4 shows the temperature and solvent ratio dependency of the solid solubility. This figure was generated using Aspen Properties™ (by Aspen Technology, Inc. of Burlington Mass.). At certain solvent composition, the solid form with lower solubility will precipitate when temperature decreases.

As part of the Aspen Plus model library, the inventive modeling system 20 can use the embedded modular utilities, such as Flash, thus making certain calculation procedures simple. For example, in lieu of getting the system saturated concentrations from the user supplied solubility data, embodiments can calculate the concentrations by calling Flash. The Flash utility generates the saturated concentration for the system at a given pressure and temperature based on the salt chemistry activated and the underlying thermodynamic framework. As a result, it is possible to model a batch crystallization process even if users are not able to provide specific solubility data.

Applicants present two case studies separately. In the first case study, applicants model the precipitation of the anhydrous solid. This is realized by activating the salt chemistry 1 (Eq. 12). The focus of this case study is to show the model's ability to generate the product CSD and the improvement of the model's accuracy by increasing the discretization. In the second case study, applicants activate the salt chemistry 2 and deal with the hydrate solid. Here, applicants focus on demonstrating the potential of the modeling framework for process design. Three sets of model results are generated to illustrate the effect of seeding on the final product CSD.

Case Study 1—Precipitating the Anhydrous Solid Form

Figure 5:
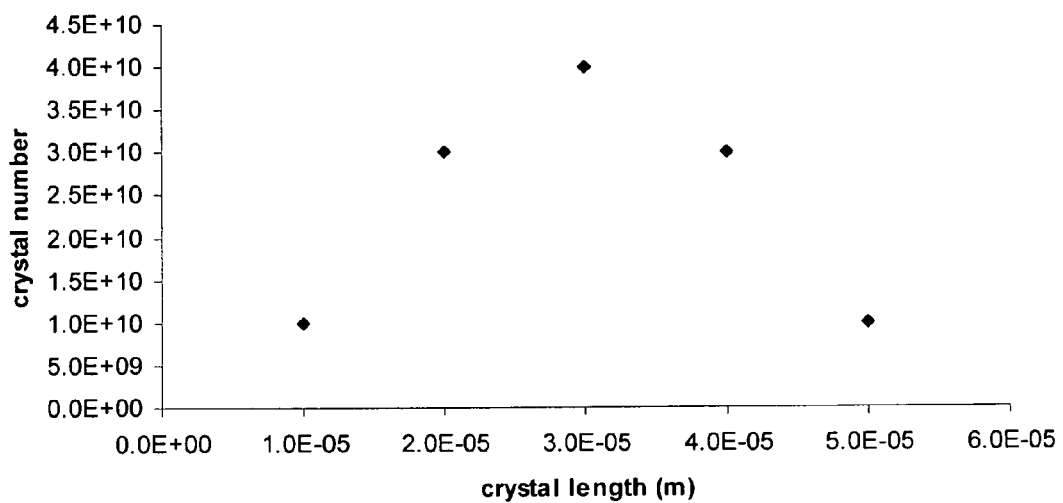
FIG. 5 is a graph of the seed CSD for case study 1.

In this case study, salt chemistry 1 (Eq. 12), which describes the formation of the anhydrous solid form, is activated. Applicants consider a cooling batch crystallization procedure. The system starts with a batch charge of total mass 1000 kg. The mass fraction is 0.1/0.2/0.7 for caffeine/water/ethanol. The operation is conducted under 1 atm. The initial system temperature is 317 K. The cooling scheme takes 4 hours to decrease the temperature to 280 K. Seeding is used to control the product CSD. Seed crystals with five different lengths are introduced into the batch crystallizer: 10, 20, 30, 40, and 50 microns. The number of seed crystals for the corresponding lengths are: 1e10, 3e10, 4e10, 3e10, and 1e10. Thus, the initial CSD in the system is shown in FIG. 5.

In the modeling framework, five crystal groups are used to represent the initial CSD:

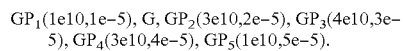

More crystal groups are introduced during the batch to account for the CSD contributed by nucleation. The number of new groups is determined by the dynamic discretization of the time grid, NT, as discussed above. Applicants first used a coarse discretization and implemented the modeling procedure using 15 time periods, NT=15. Eq. 1 is used as the growth kinetics model with the parameter values: $k_G$=1e-6, g=1.0, γ=3.5, α=0.8. Thus:

$$\frac{dL}{dt} = 1e - 6 \cdot (\Delta C)^{1.0}(1 + 3.5 \cdot L_i)^{0.8}$$

The secondary nucleation equation of Eq. 8 is used as the nucleation kinetics model with the parameter values: $k_N'$=5e9, β=1.0, b=2.0. Thus:

$$\frac{dNu}{dt} = 5e9 \cdot M_T^{1.0} \Delta C^{2.0}$$

The full set of parameter values used for the simulation is listed in the Appendix. At the end of the batch process, the model generated the product CSD shown in FIG. 6.

Figure 6:
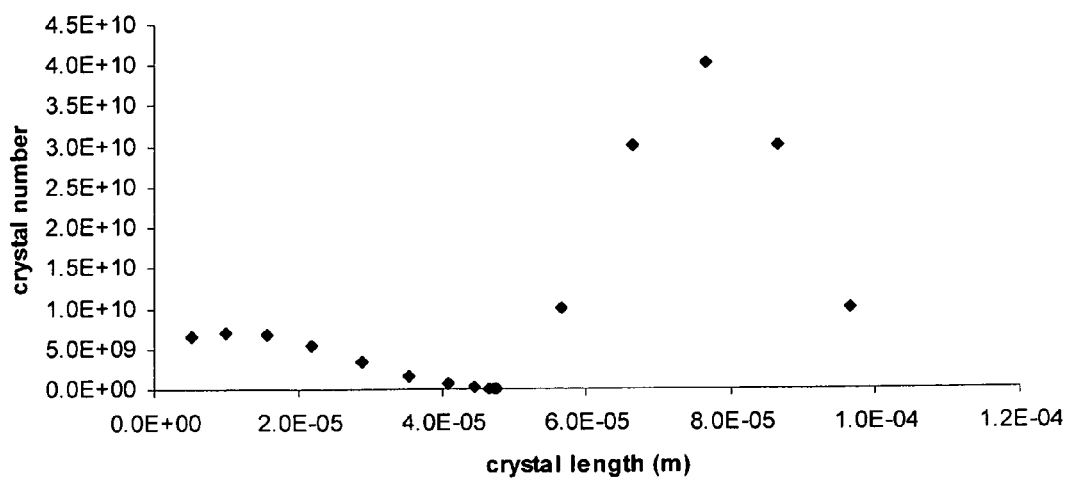
FIG. 6 is a graph of the product CSD for case study 1 using 15 time periods.
Figure 7:
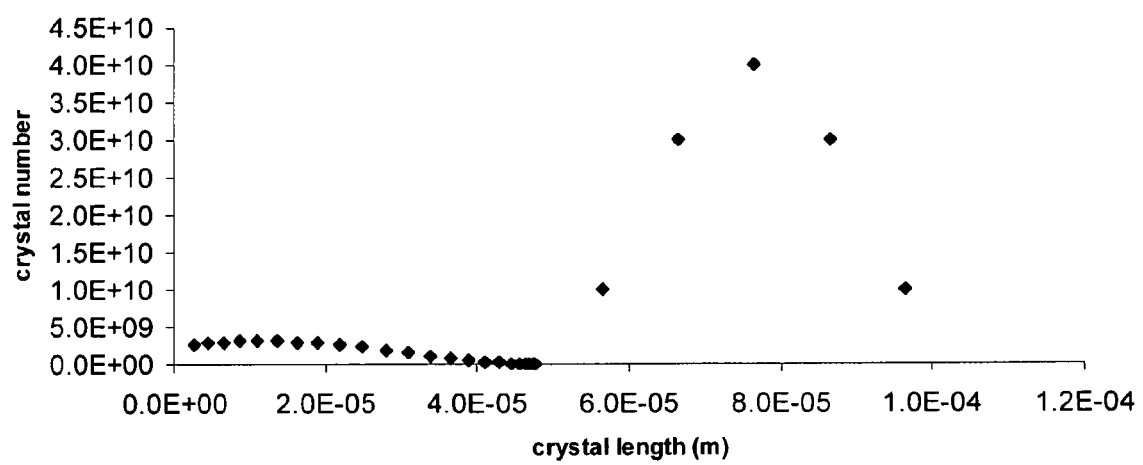
FIG. 7 is a graph of the product CSD for case study 1 using 30 time periods.

FIG. 6 shows the tail of the curve, which represents the contribution of nucleation on the crystal size distribution. The numbers of nuclei are related to the supersaturation profile during the batch. The generation of nuclei at different elapsed times of the batch leads to the different crystal growing periods, resulting in the CSD shown in FIG. 6. This figure implies that nucleation has a significant effect on the product CSD, which deviates from the commonly observed behavior of seeded batch crystallization processes. This inconsistency is caused by the coarse discretization employed in the model. This can be resolved by using more time periods, which leads to a finer discretization of the time grid and consequently and increased accuracy of nucleation modeling. FIG. 7 shows the product CSD generated by the model using 30 time periods, NT=30, where the overestimation of nucleation effect in the previous case is corrected.

Comparing the two simulation results, applicants see that the effect of the tail on the overall shape of the curve is decreased by increasing nucleation modeling accuracy. Crystals growing from seed crystals dominate the product CSD. This indicates that the model results agree with the experimental observation that the influence nucleation has on the product CSD can be made insignificant in a seeded batch crystallization process.

Case Study 2—Precipitating the Hydrate Solid Form

In the second case study, applicants consider a cooling batch crystallization process for the hydrate solid. In the model, the salt chemistry 2 is activated (Eq. 13). Applicants start from a batch charge of total mass 1000 kg with the mass fraction: 0.2/0.2/0.6 for caffeine/water/ethanol. The operation is conducted under 1 atm. The initial system temperature is 313 K. The cooling scheme takes 6 hours to decrease the temperature to 275 K. The same set of kinetics equations for crystal growth and nucleation as in the previous case study is also used here. All the parameter values are listed in the Appendix. Applicants experiment with three different seeding specifications to show how to control the product CSD.

First Run:

The seed crystals have eight characteristic lengths represented as:

$GP_1$(1e7,1e-5), $GP_2$(2e7,1.5e-5), $GP_3$(4e7,2e-5), $GP_4$(8e7,2.5e-5), $GP_5$(1.6e8,3e-5) $GP_6$(3.2e8, 3.5e-5), $GP_7$(1e8,4e-5), $GP_8$(2e7,4.5e-5)

Figure 8:
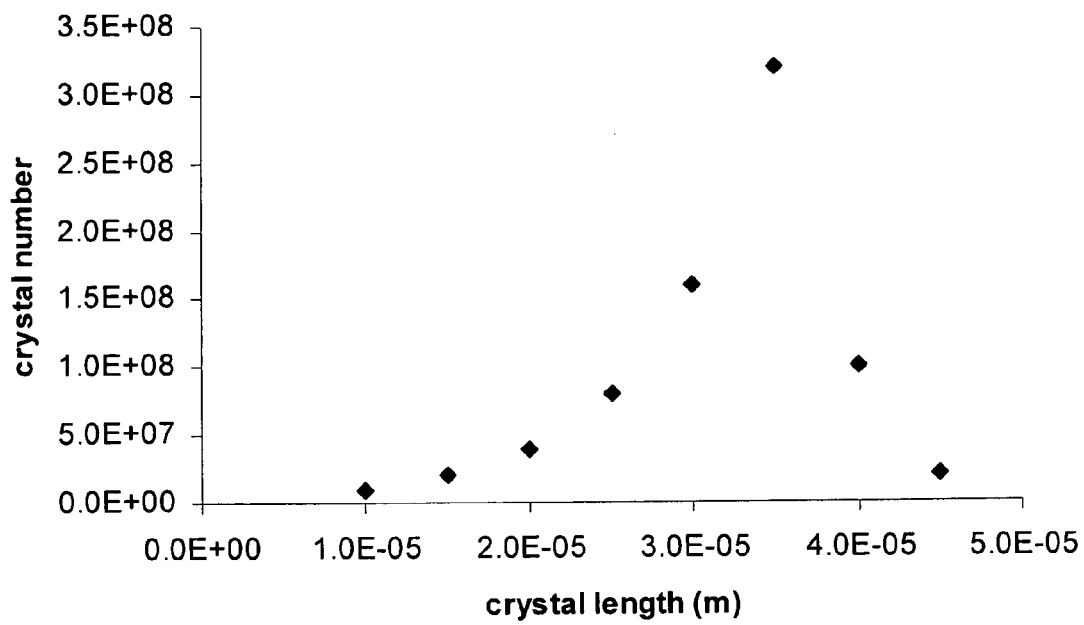
FIG. 8 is a graph of the seed CSD for case study 2, first run.
Figure 9:
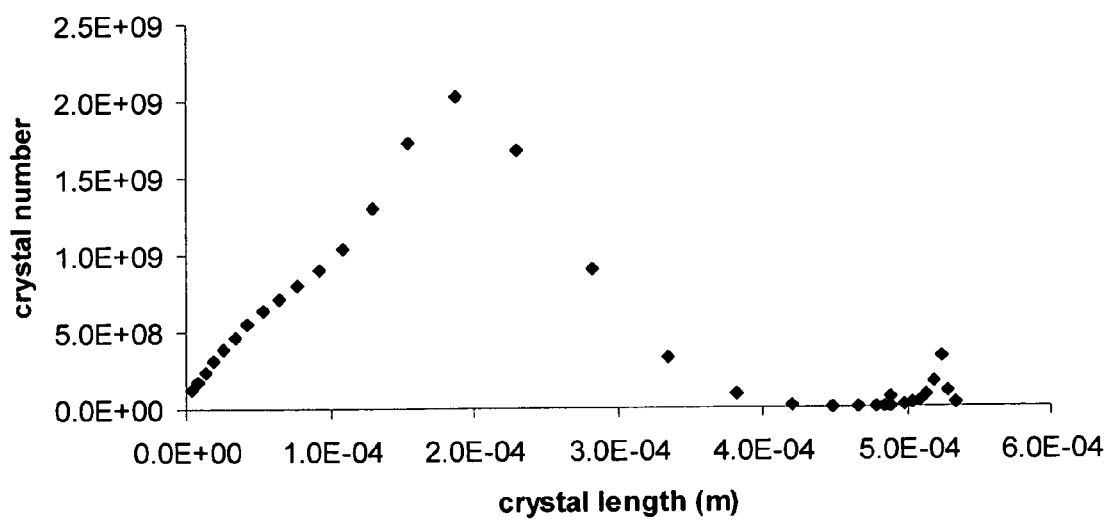
FIG. 9 is a graph of the product CSD for case study 2, first run.

The CSD of seed crystals are shown in FIG. 8. During the batch, the model simulates the nucleation and tracks the crystals growing from seed crystals and from nuclei. The final product CSD is generated and represented in FIG. 9. The curve in FIG. 9 has two peaks. The one on the left represents the contribution of crystals growing from nuclei and the one on the right represents the contribution of crystals growing from seed crystals. The left peak is much higher than the right one, representing the stronger influence of nucleation on the final CSD than the influence of seeding. Analyzing this result, applicants realized that the seed crystals added into the system did not actually control the CSD. The problem might be caused by the small number of seed crystals used in the first run, which was not enough to control the system.

Second Run:

In the second run, applicants maintain the same operational conditions as before, but increase the number of seed crystals for all the characteristic groups to ten times the number in the first run. The eight seed crystal groups are now represented as:

$GP_1$(1e8,1e-5), $GP_2$(2e8,1.5e-5), $GP_3$(4e8,2e-5), $GP_4$(8e8,2.5e-5), $GP_5$(1.6e9,3e-5) $GP_6$(3.2e9, 3.5e-5), $GP_7$(1e9,4e-5), $GP_8$(2e8,4.5e-5)

Figure 10:
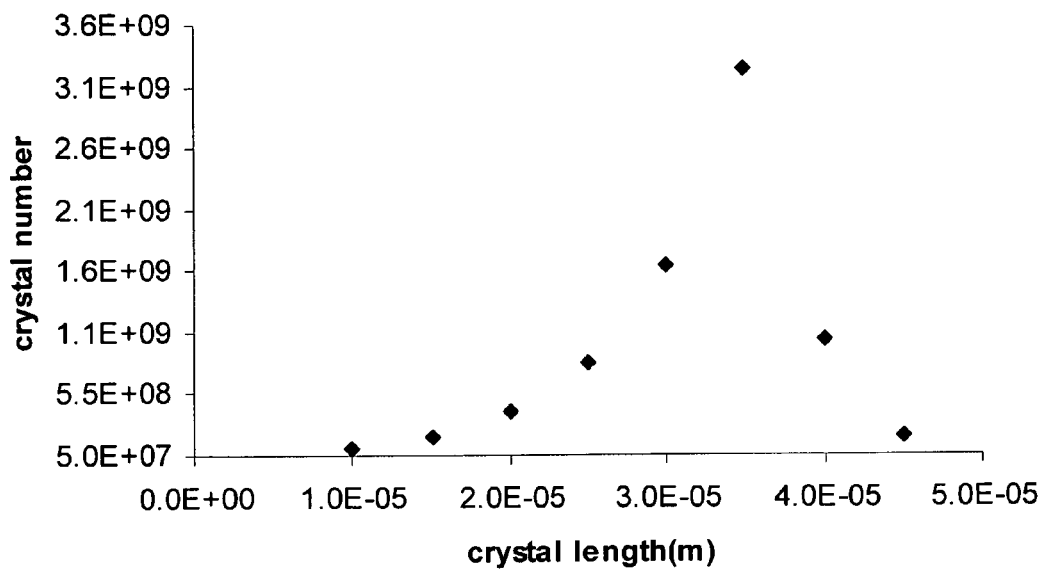
FIG. 10 is a graph of the seed CSD for case study 2, second run.
Figure 11:
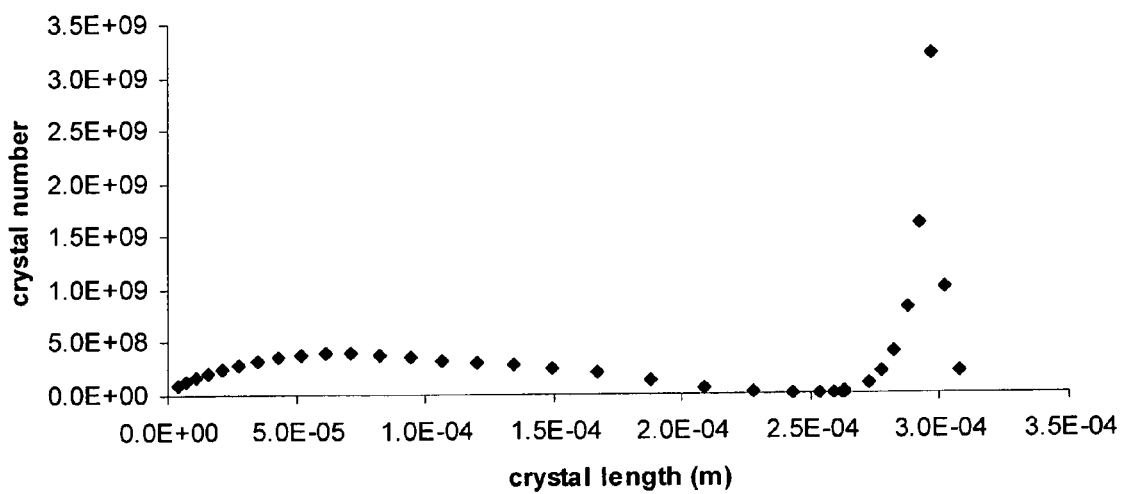
FIG. 11 is a graph of the product CSD for case study 2, second run.

The shape of the CSD curve for the seeds, shown in FIG. 10, is similar to the one for the first run, but shifted towards larger length. Starting from the new number of seeds, the model performs the same procedure of calculation and generates the product CSD curve shown in FIG. 11. In FIG. 11, applicants still see two peaks: the left one representing the nucleation contribution to the product CSD and the right one representing the contribution of seeds. In this run, the left peak height is not negligible compared to the right one, which reflects the fact that seeding has certain control over the final CSD, but nucleation still significantly affects the final results.

Third Run:

In the third run, applicants use even more seed crystals, aiming to achieve a better control. This time, the number of seed crystals in each group is 100 times greater than that used in the first run. The groups representing the seed crystals are:

$GP_1$(1e9,1e-5), $GP_2$(2e9,1.5e-5), $GP_3$(4e9,2e-5), $GP_4$(8e9,2.5e-5), $GP_5$(1.6e10,3e-5) $GP_6$(3.2e10, 3.5e-5), $GP_7$(1e10,4e-5), $GP_8$(2e9,4.5e-5)

Figure 12:
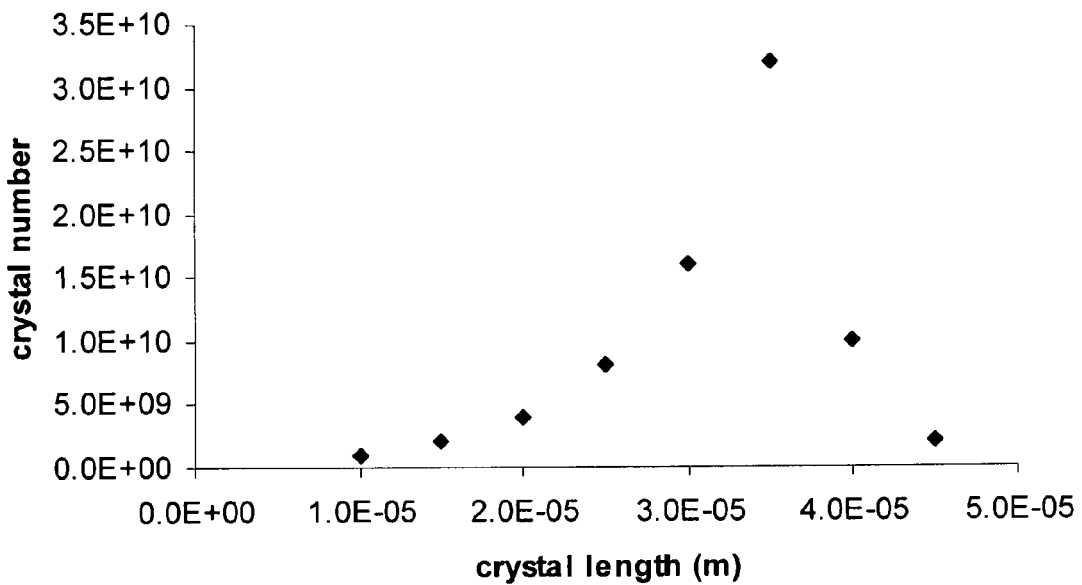
FIG. 12 is a graph of the seed CSD for case study 2, third run.
Figure 13:
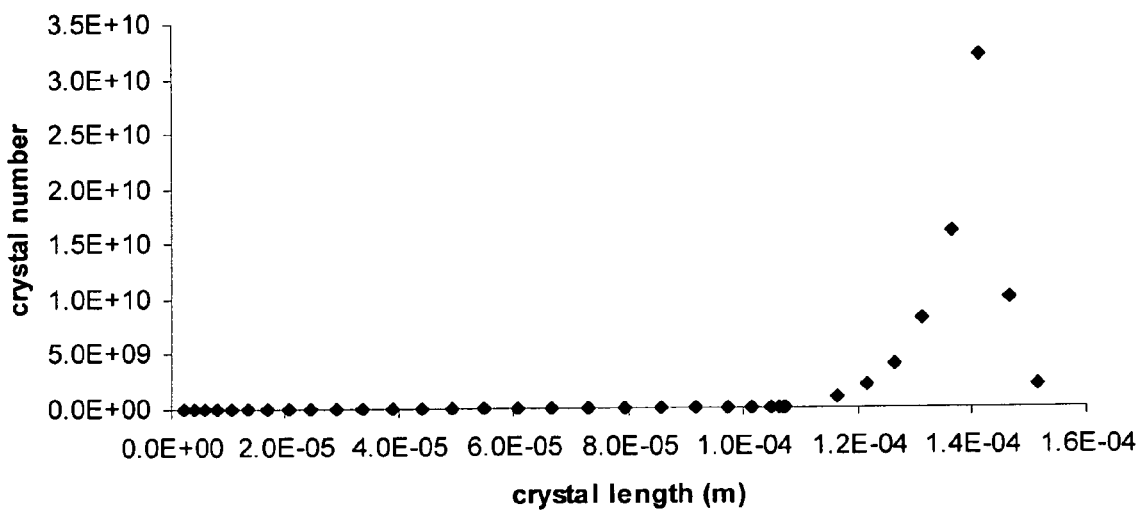
FIG. 13 is a graph of the product CSD for case study 2, third run.

The batch still starts from a similar seed CSD shown in FIG. 12. The calculation procedure is the same as that was used in the first two runs. The model generates the final product CSD represented by the curve in FIG. 13. In FIG. 13, the curve only shows one clear peak which represents the crystals growing from seeds. The left peak existing in the previous two runs is not clear in this figure, as its height is too small comparing to the right one. The shape of this curve is similar to the seed CSD curve shown in FIG. 12. The product CSD in this batch can be considered fully controlled by seeding.

The three runs and their corresponding results we discussed above demonstrate that the number of seed crystals is important. If the number of seeds is too small, the desired controlling effect on product cannot be achieved, but it is not good practice to always use excessive amount of seeds because it is either wasteful or there might not be enough seeds available. In process design, it is critical to know how to set the right operational conditions, including the number of seed crystals. Applicants' modeling framework and invention have the potential to serve as a fundamental tool for process design.

Using these two case studies, applicants demonstrated that the new modeling framework proposed has the ability to generate a product CSD for a batch crystallization process. The crystal group concept and the dynamic group addition procedure allow the model to account for the crystal growth from seeds and from nuclei. The consideration of crystal breakage is also included into the calculation procedure. By focusing on the tracking of crystal sizes, the present invention avoids dealing directly with IPDAE systems using the traditional treatment for time derivatives, which normally requires intensive understanding of numerical methods and complicated calculation procedures. The present inventive modeling procedure takes into account the physical phenomena and solves a sequence of ODE systems, which ensures the simplicity and speed of accurate results. This modeling framework has the great potential to aid in process design.

APPENDIX

Simulation Parameters

As discussed above, embodiments of the invention are part of the Aspen Plus model library, thus can use the embedded well-developed calculation utilities. In the case studies, the inventive model relied on the Flash utility for the calculations of saturated concentrations. To use Flash, the inventive system components need to have property parameters—NRTL-SAC parameters in these cases, and the salt chemistry parameters. These parameters are regressed using Aspen Properties based on the data provided in the Bustamante article referenced above. The parameter values are shown in the following tables:

TABLE 1

NRTL-SAC parameters

| Component i | Component j X − R | Component j Y − R | Component j Y + R | Component j Z − R |
|---|---|---|---|---|
| ETHANOL | 0.25095644 | 0.02978373 | 0 | 0.63034543 |
| WATER | 0 | 0 | 0 | 1 |
| CAFFEINE | 0 | 0 | 2.23224965 | 2.24898645 |

TABLE 2

Salt chemistry parameters $$\ln(Keq) = A + \frac{B}{T} + C \cdot \ln(T) + D \cdot T \quad T \text{ in Kelvin}$$

| | salt chemistry 1 CAFFEINE ⇔ ANHYDROUS | salt chemistry 1 CAFFEINE + WATER ⇔ HYDRATE |
|---|---|---|
| A | 5.2327 | 13.3511 |
| B | −3066.4784 | −5587.6550 |
| C | 0.0 | 0.0 |
| D | 0.0 | 0.0 |

TABLE 3

Kinetic parameters

| | Crystal growth $G(L) = \frac{dL}{dt} = k_G(\Delta C)^g(1 + \gamma L)^\alpha$ | | | | Nucleation $B = k_N' M_T^\beta \Delta C^b$ | | |
|---|---|---|---|---|---|---|---|
| | $k_G$ | g | $\gamma$ | $\alpha$ | $k_N'$ | $\beta$ | b |
| Case study 1 | 1e−6 | 1.0 | 3.5 | 0.8 | 5e9 | 1.0 | 2.0 |
| Case study 2 | 5e−6 | 1.0 | 5.0 | 1.0 | 1e9 | 1.0 | 2.0 |

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of modeling a crystallization process comprising:
   in a computer processor:
   a) given a plurality of crystals in a solution, dividing the plurality into different subsets and representing the different subsets, wherein each subset forms a respective crystal group characterized by multiple group attributes, the multiple group attributes for a respective crystal group including at least: (i) a number of crystals and (ii) a group characteristic length, the group characteristic length being the characteristic length of the crystals in the respective crystal group, said dividing being non-repeated throughout the crystallization process;
   b) for each formed crystal group, tracking across time increase of the respective group characteristic length of the crystal group by tracking crystal growth kinetics of the crystal group over the crystallization process, wherein step a) is not repeated throughout the crystallization process; and
   c) across each of the formed crystal groups, determining a characteristic length distribution of the tracked group characteristic lengths of the formed crystal groups to output a model to a user, the determined characteristic length distribution being distribution of the respective group characteristic lengths of the respective crystal groups,
   wherein the tracking step b) and determining step c) occur multiple times throughout the crystallization process without step a) being repeated throughout the crystallization process.

2. The method of claim 1, wherein the crystallization process is a batch process.

3. The method of claim 1, wherein the crystallization process is a continuous process.

4. The method of claim 1, further including the step of tracking generation of new crystal groups generated by seeding, nucleation, or breakage.

5. The method of claim 4, further including the step of tracking change in number of crystals in each crystal group.

6. The method of claim 5, wherein the change in the number of crystals in a respective crystal group is a result of crystal breakage.

7. The method of claim 4, wherein the step of tracking generation of new crystal groups generated by nucleation includes computing the number of nuclei generated during a discrete time interval by calculating:

$$B = \frac{dNu}{dt} = k_N I^\phi M_T^\beta (\Delta C)^b,$$

wherein:
  B is a nucleation rate,
  Nu is a number of nuclei generated during the discrete time interval,
  $k_N$ is a nucleation rate constant,
  I is an agitation rate and $\phi$ is an experimentally determined constant,
  $M_T$ is a suspension density,
  $\beta$ is an exponent of the suspension density,
  $\Delta C$ is the supersaturation of the solution, and
  b is a kinetic order of the nucleation rate.

8. The method of claim 4, wherein the step of tracking generation of new crystal groups generated by breakage of a given parent crystal group includes:
  i) computing the number of crystals in each child crystal group as the number of crystals in the parent crystal group whose respective characteristic length exceeds a breakage length threshold multiplied by a breakage ratio and multiplied by number of crystal fragments, and
  ii) computing the characteristic length of the respective child crystal group by dividing the characteristic length of the respective parent crystal group by the number of crystal fragments.

9. The method of claim 1, wherein increase of the respective characteristic length of each crystal group is the result of crystal growth.

10. The method of claim 1, wherein for a given crystal group, the number of crystals in the crystal group is calculated by dividing a mass of the crystal group by a density of crystals.

11. The method of claim 1, wherein the tracking step is performed over discrete time intervals.

12. The method of claim 1, wherein the step of tracking the increase of the respective characteristic length of each crystal group includes calculating:

$$G(L) = \frac{dL}{dt} = k_G (\Delta C)^g (1 + \gamma L)^\alpha,$$

wherein:
  G(L) is a growth rate in length L of a single crystal,
  $k_G$ is an overall crystal growth coefficient,
  $\Delta C$ is supersaturation of the solution,
  g is an overall order of the crystal growth process,
  $\gamma$ is an experimentally determined constant, and
  $\alpha$ is an experimentally determined constant.

13. The method of claim 12, further including computing the supersaturation of the solution by calculating $\Delta C = C - C^*$, wherein:
  C is a bulk concentration of a solute in a solvent, and
  $C^*$ is a saturated concentration of the solute in the solvent.

14. A computer program product, comprising a non-transient computer readable storage medium having stored thereon a set of computer program instructions for modeling a crystallization process, including the instructions to:

a) given a plurality of crystals in a solution, divide the plurality into different subsets and represent the different subsets, wherein each subset forms a respective crystal group characterized by multiple group attributes, the multiple group attributes for a respective crystal group including at least: (i) a number of crystals and (ii) a group characteristic length, the group characteristic length being the characteristic length of the crystals in the respective crystal group, said dividing being non-repeated throughout the crystallization process;
b) for each formed crystal group, track across time increase of the respective group characteristic length of the crystal group by tracking crystal growth kinetics of the crystal group over the crystallization process, wherein step a) is not repeated throughout the crystallization process;
c) track generation of new crystal groups; and
d) across each of the formed crystal groups, determining a characteristic length distribution of the tracked group characteristic lengths of the formed crystal groups to output a model to a user, the determined characteristic length distribution being distribution of the respective group characteristic lengths of the respective crystal groups,
wherein the tracking steps b) and c) and determining step d) occur multiple times throughout the crystallization process without step a) being repeated throughout the crystallization process.

15. The computer program product of claim 14, wherein at least some portion of the set of computer program instructions include instructions to request data or request instructions over a computer network.

16. The computer program product of claim 14, wherein at least some portion of the set of computer program instructions is transmitted over a global computer network.

17. The computer program product of claim 14, wherein the computer readable storage medium includes a removable storage medium.

18. The computer program product of claim 17, wherein the removable storage medium includes any of a CD-ROM, a DVD-ROM, a diskette, and a tape.

19. A computer system for modeling a crystallization process, the computer system comprising:
  a) input means for obtaining user-provided chemical data;
  b) a digital processor coupled to receive the obtained chemical data from the input means, wherein the digital processor executes a modeling system in working memory, wherein the modeling system:
    i) represents a plurality of crystals in a solution by dividing the plurality into different subsets and representing the different subsets, wherein each subset forms a respective crystal group characterized by multiple group attributes, the multiple group attributes for a respective crystal group including at least: (1) a number of crystals and (2) a group characteristic length, the group characteristic length being the characteristic length of the crystals in the respective crystal group, said dividing being non-repeated throughout the crystallization process;
    ii) for each formed crystal group, tracks across time increase of the respective group characteristic length of the crystal group by tracking crystal growth kinetics of the crystal group over the crystallization process, wherein step i) is not repeated throughout the crystallization process;
    iii) tracks generation of new crystal groups; and
    iv) across each of the formed crystal groups, determines a characteristic length distribution of the tracked group characteristic lengths of the formed crystal groups, and from the characteristic length distribution forms a model of the crystallization process, the determined characteristic length distribution being distribution of the respective group characteristic lengths of the respective crystal groups, wherein the tracking steps ii) and iii) and determining step iv) occur multiple times throughout the crystallization process without step i) being repeated throughout the crystallization process; and c) an output means coupled to the digital processor, the output means providing to a user the formed model of the crystallization process.

20. A pharmaceutical compound manufactured by a process that includes a modeling method, wherein the modeling method models a crystallization process and comprises the computer implemented steps of:

a) representing a plurality of crystals of the pharmaceutical compound in a solution, said representing including dividing the plurality into different subsets and representing the different subsets, wherein each subset forms a respective crystal group characterized by multiple group attributes, the multiple group attributes for a respective crystal group including at least: (i) a number of crystals and (ii) a group characteristic length, the group characteristic length being the characteristic length of the crystals in the respective crystal group, said dividing being non-repeated throughout the crystallization process;

b) for each formed crystal group, tracking across time increase of the respective group characteristic length of the crystal group by tracking crystal growth kinetics of the crystal group over the crystallization process, wherein step a) is not repeated throughout the crystallization process; and c) across each of the formed crystal groups, determining a characteristic length distribution of the tracked group characteristic lengths of the formed crystal groups, the determined characteristic length distribution being distribution of the respective group characteristic lengths of the respective crystal groups to output a model of the crystallization process that enables the manufacture of the pharmaceutical compound, wherein the tracking step b) and determining step c) occur multiple times throughout the crystallization process without step a) being repeated throughout the crystallization process.

* * * * *